Sept. 9, 1924.  1,508,331
F. W. HUBER
TREATMENT OF GASES CONTAINING DUST AND FUME
Filed May 22, 1918
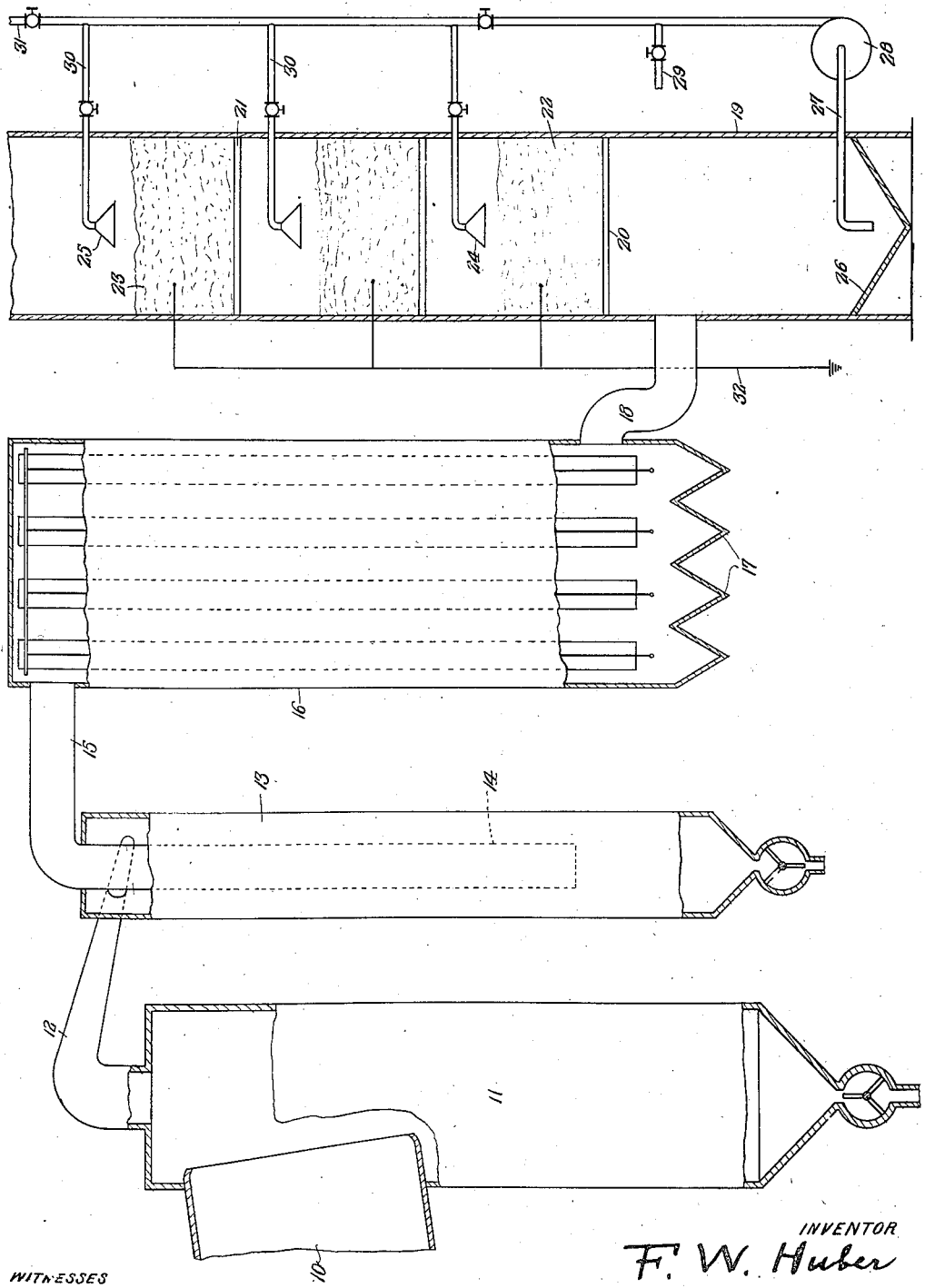
INVENTOR
F. W. Huber
by A. B. Foster
ATTORNEY
WITNESSES
J H Crawford Patented Sept. 9, 1924.

1,508,331

UNITED STATES PATENT OFFICE.

FREDERICK W. HUBER, OF RIVERSIDE, CALIFORNIA, ASSIGNOR, BY MESNE ASSIGNMENTS, TO WESTERN PRECIPITATION COMPANY, A CORPORATION OF CALIFORNIA.

TREATMENT OF GASES CONTAINING DUST AND FUME.

Application filed May 22, 1918. Serial No. 235,945.

*To all whom it may concern:*

Be it known that I, FREDERICK W. HUBER, a citizen of the United States, residing at Riverside, in the county of Riverside and State of California, have invented certain new and useful Improvements in the Treatment of Gases Containing Dust and Fume, of which the following is a specification.

The treatment of the exit gases from the cement kilns, for example rotary cement kilns in which a pulverized mixture of argillaceous and calcareous materials is calcined and clinkered for the production of Portland cement, is a somewhat difficult operation, and various methods have heretofore been proposed for accomplishing this result, among such methods being the so-called "Cottrell system" of electrical precipitation. This mode of treatment consists essentially in subjecting the flowing current of gases carrying the dust and fume, to high potential direct current discharge, between electrodes placed in the path of the gas current. This operation may be combined with a cooling operation, and was expected to precipitate out of the gases another amount of dust and fume carried therein. In actual practice the electrical precipitation has given very satisfactory results on the precipitation of the dust carried in gases, but so far as I have been advised, the quantitative removal of the fumes of potassium and sodium salts by electrical precipitation is impossible, the most efficient plants for the treatment of cement kiln exit gases removing only about 50 to 60% of the potassium salts from the gases. The gases which leave the electrical "treater," carry a considerable static electrical charge, and it has been proposed to further subject the said gases to a wet treatment, for the removal of a further quantity of the fumes.

In accordance with the present invention I have found that an entirely feasible method of treating the exit gases coming from the electrical precipitator, is to pass these gases through one or more beds of electrically conductive material such as metal, for example iron turnings, iron wire, or small irregular pieces of iron, and for the production of the best results, the mass of iron material is preferably dry or substantially so. A convenient way of applying this step, is to form a grid in the stack leading from the electrical treater, and to place upon this grid, a mass or iron wire, iron turnings or the like, through which the gases are to pass. The gases in passing through the interstitial spaces of this mass of iron will give up their electrical charge, and also a large amount of the fume will be precipitated upon the surface of the iron. It is advisable to place several grids one above the other, preferably spaced apart, and the masses of iron wire or turnings may be a foot or more in thickness.

In order to remove the accumulation of salts from the surface of the iron, it is advisable to flush the same at intervals with water, for which purpose water may be introduced above the masses of iron or above each of these, and the solution may be withdrawn from the bottom of the stack and circulated so as to pass over the mass of iron several times. It is advisable, however, not to continuously circulate the liquid, but to merely wash off the accumulation of salts, and then shut off the flow of water; after which the masses of metal will quickly dry, and the precipitation of the fumes seems to be much more effective, while the mass of iron or other metal is dry, or substantially dry.

The ordinary stack made of brick work is a sufficiently good electrical conductor to carry off the electrical charge taken up by the metal, so that the masses of metal in the stack are actually grounded sufficiently for the accomplishment of this purpose, by being in contact with the walls of the stack.

While I have referred in the above description to the use of iron particularly, I call attention to the fact that various other metals can be conveniently employed, or in place of metals other materials which are relatively good electrical conductors can be used. Also if desired mixtures of materials, some of which are good electrical conductors and other of which are not can likewise be employed.

A specific advantage of applying this subsequent treatment in the stack following the electrical treater is that the alkali metal salts are separated from the gases after the substantially complete removal of the flue dust and hence are in a relatively pure state.

The process can be carried out in apparatus such as is shown in the accompanying drawing, the figure representing a horizontal section of the essential features of the entire plant, parts being shown in section. In said drawing 10 represents the upper end of an ordinary rotary cement kiln of which the exit gases discharge into a dust chamber 11, and are thence conveyed by pipe 12 to a suitable cyclone separator 13, which is preferably of the tall narrow shape illustrated, having the central up-take 14, leading to a flue 15, which conveys the gases into a suitable electrostatic separator 16 provided with electrodes in the manner well known in the art. The gases here deposit a large proportion of their contained dust, which drops into the hopper-shaped bins 17, at the bottom, and may be suitably withdrawn therefrom. The gases then pass through the pipe 18 into the stack 19. This stack is provided with a number of grids 20 and 21, carrying thereupon masses of metal 22 and 23, which may be iron turnings, steel turnings or similar material. Above these masses of metal are placed spray nozzles 24 and 25 for continuously or periodically washing off the accumulation of salts of potassium and other material. The liquor accumulates in the bottom of the stack above the partition 26 and may be drawn off by pipe 27, and centrifugal pump 28, and may either be withdrawn through the valved pipe 29, or returned through valved pipe 30 to the sprays 24 and 25. 31 represents a pipe for supplying additional quantities of water as needed.

The stack 19 may be made of brick work or similar material, which is electrically conductive, or the masses of metal 22 and 23, may be suitably grounded by wire connections 32, provided for that purpose.

What I claim is:—

1. In the precipitation of fume from cement kiln exit gases by high potential electric discharge, the step of bringing the gases containing potassiferous fume material, after being subjected to such electrical discharge, into interstitial spaces in a mass of substantially dry electrically conductive material having the property of de-electrifying said gases.

2. In the precipitation of the fume carried by cement kiln exit gases, the herein described improvement which comprises passing such gases through a high potential electrical discharge precipitator, whereby a part of the fume is precipitated from the gases, and whereby the gases become to some extent electrified, and thereafter passing the said gases still containing some potassiferous fume through a mass of electrically conductive material capable of de-electrifying said gases, whereby a portion of the fume deposits on said electrically conductive material in the form of potash salts.

3. The process of recovering dust and fume from cement kiln exit gases containing the same, which comprises subjecting a flowing current of such gases, first to high potential electrical discharge, whereby at least the bulk of the dust is thrown out of the gases together with a part only of the fume, and thereafter passing the gases carrying some of the fume through a grounded mass of reticulated metal having the property of de-electrifying the gases, whereby a considerable amount of the fume is deposited upon said mass in the form of potash salts, and washing down the latter with an aqueous liquid at intervals only.

4. In the precipitation of fume from a gas current by high potential electrical discharge, the step of bringing the gases, after being subjected to such discharge, into interstitial spaces in a mass of electrically conductive material and washing such mass of material at intervals only with a liquid capable of removing the deposited fume.

5. An installation of apparatus comprising a cement kiln, an electrical precipitation device, a grounded mass of material capable of de-electrifying gases from said kiln, such material having gas passages extending therethrough and connections therebetween, for passing the exit gases of the cement kiln through said electrical precipitation device and through such mass of de-electrifying material in the order stated.

6. An installation of apparatus comprising an electrical precipitation device adapted for operation with a cement kiln, a grounded mass of material capable of de-electrifying gases from said kiln, such material having gas passages extending therethrough, and connections therebetween for passing the exit gases of the cement kiln through said electrical precipitation device and through such mass of de-electrifying material in the order stated.

In testimony whereof I affix my signature

FREDERICK W. HUBER.